US012612286B2

(12) United States Patent
Kubo et al.

(10) Patent No.: US 12,612,286 B2
(45) Date of Patent: Apr. 28, 2026

(54) ELEVATOR DEVICE

(71) Applicant: Hitachi, Ltd., Tokyo (JP)

(72) Inventors: Yosuke Kubo, Tokyo (JP); Tomohisa Hayakawa, Tokyo (JP); Hidetaka Zama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1045 days.

(21) Appl. No.: 17/770,096

(22) PCT Filed: Nov. 8, 2019

(86) PCT No.: PCT/JP2019/043842
§ 371 (c)(1),
(2) Date: Apr. 19, 2022

(87) PCT Pub. No.: WO2021/090474
PCT Pub. Date: May 14, 2021

(65) Prior Publication Data
US 2022/0380176 A1 Dec. 1, 2022

(51) Int. Cl.
*B66B 5/06* (2006.01)
*B66B 5/22* (2006.01)

(52) U.S. Cl.
CPC . *B66B 5/06* (2013.01); *B66B 5/22* (2013.01)

(58) Field of Classification Search
CPC ........................................................ B66B 5/22
See application file for complete search history.

(56) References Cited

U.S. PATENT DOCUMENTS

| | | | |
|---|---|---|---|
| 5,628,385 | A | 5/1997 | Yumura et al. |
| 2017/0073191 | A1 | 3/2017 | Thumm et al. |
| 2019/0144240 | A1 | 5/2019 | Steinhauer et al. |

FOREIGN PATENT DOCUMENTS

| | | | |
|---|---|---|---|
| CN | 106032235 | A | 10/2016 |
| EP | 4 005 960 | A1 | 6/2022 |
| JP | 9-40317 | A | 2/1997 |

(Continued)

OTHER PUBLICATIONS

International Search Report (PCT/ISA/210) issued in PCT Application No. PCT/JP2019/043842 dated Jan. 7, 2020 with English translation (four (4) pages).

(Continued)

*Primary Examiner* — Jianchun Qin
(74) *Attorney, Agent, or Firm* — Crowell & Moring LLP

(57) ABSTRACT

An elevator device having a safety gear is disclosed that makes it possible to prevent a braking state detecting switch from being turned on in case of power interruption, while becoming activated by an electrically operated actuator. This elevator device includes a safety gear which is provided onto an elevator car and an electrically operated actuator which activates the safety gear and has a braking state detecting switch (6) to detect a braking state of the safety gear. The braking state detecting switch (6) is actuated by a mechanism (10, 82, 83) which is mobilized by a braking element (51) of the safety gear. Displacement of the braking element (51) when power supply is lost keeps the braking state detecting switch (6) in an off state. Displacement of the braking element (51) in a braking by the safety gear turns on the braking state detecting switch (6).

8 Claims, 4 Drawing Sheets

(56) References Cited

FOREIGN PATENT DOCUMENTS

| | | | | |
|---|---|---|---|---|
| JP | 2013189283 | A | * | 9/2013 |
| JP | 2016-64884 | A | | 4/2016 |

OTHER PUBLICATIONS

Japanese-language Written Opinion (PCT/ISA/237) issued in PCT Application No. PCT/JP2019/043842 dated Jan. 7, 2020 (four (4) pages).

Communication in Cases for Which No Other Form is Applicable (PCT/IB/345) issued in PCT Application No. PCT/JP2019/043842 dated Mar. 9, 2022 (nine (9) pages).

"Safety Rules for the Construction and Installations of Lifts—Part 1 Electric Lifts", European Committee for Standardization, Dec. 2009, pp. 1-9, vol. ASME A17.1-2007, No. CSA B44-07, (nine (9) pages).

"Safety Code for Elevators and Escalators", The American Society of Mechanical Engineers, Apr. 2007, vol. ASME A17.1-2007, No. CSA B44-07, (11 pages).

Communication Purusant to Rule 114(2) EPC issued in European Application No. 19951955.4 dated Oct. 17, 2023 (2 pages).

"Overspeed governor EOS (Operating Instructions)", Wittur, Jan. 23, 2013, version J-31.07.2017 (60 pages).

Communication Pursuant to Rule 114(2) EPC issued in European Application No. 19951955.4 dated Oct. 27, 2023 (22 pages).

European Office Action issued in European Application No. 19 951 955.4 dated Mar. 6, 2024 (4 pages).

* cited by examiner

ELEVATOR DEVICE

TECHNICAL FIELD

The present invention relates to an elevator device equipped with a safety gear which is activated by an electrically operated actuator.

BACKGROUND ART

An elevator device is equipped with a governor and a safety gear for constantly monitoring the ascending and descending speed of the elevator car and emergently stopping the elevator car that has fallen into a predetermined overspeed state. Typically, the elevator car and the governor are interlinked by a governor rope. Upon detecting an overspeed state, the governor immobilizes the governor rope, thereby activating the safety gear at the elevator car side to put the elevator car in emergency stop.

Space saving and cost reduction are difficult for such an elevator device because the long governor rope is installed inside a hoistway. In addition, the governor rope, when swinging, is liable to interfere with a structure inside the hoistway.

Regarding this, a safety gear without using the governor rope is proposed.

As a prior art concerning the safety gear without using the governor rope, a technical approach described in Patent Literature 1 is known. In this prior art, a brake unit having a wedge-shaped brake shoe is provided onto the underside of an elevator car and a brake link is connected to the brake shoe. When a solenoid is actuated by a command from a controller, the brake link is moved upward by a mechanism interlinked with the solenoid. Thereby, the brake shoe is pulled up to brake the elevator car.

CITATION LIST

Patent Literature

Patent Literature 1: Japanese Patent Application Laid-Open No. 2013-189283

SUMMARY OF INVENTION

Technical Problem

In the conventional safety gear that is activated by an electrically operated actuator like a solenoid, as noted above, if it is provided with a braking state detecting switch to detect that the safety gear is placed in a braking state, when the safety gear comes into the braking state because of power interruption, the braking state detecting switch is turned on. For this reason, there is a problem that the elevator cannot be restarted until the on state is switched off by a technical expert.

Therefore, the present invention provides an elevator device having a safety gear that makes it possible to prevent the braking state detecting switch from being turned on in case of power interruption, while becoming activated by an electrically operated actuator.

Solution to Problem

To solve the problem noted above, an elevator device according to the present invention includes a safety gear which is provided onto an elevator car and an electrically operated actuator which activates the safety gear. The elevator device has a braking state detecting switch to detect a braking state of the safety gear. The braking state detecting switch is actuated by a mechanism which is mobilized by a braking element of the safety gear. Displacement of the braking element when power supply is lost keeps the braking state detecting switch in an off state. Displacement of the braking element in a braking by the safety gear turns on the braking state detecting switch.

Advantageous Effects of Invention

According to the present invention, on one hand, emergency braking operation of the safety gear is ensured; on the other hand, in case of power interruption, the braking state detecting switch is not turned on even though the electrically operated actuator is put in operation.

Problems, features and advantageous effects other than noted above will become apparent from the following description of embodiments.

DESCRIPTION OF EMBODIMENTS

Embodiments of the present invention are described below with Examples 1 and 2 through the use of the drawings. Note that identical reference numbers throughout the drawings denote the same components or components having similar functions.

Example 1

Figure 1:
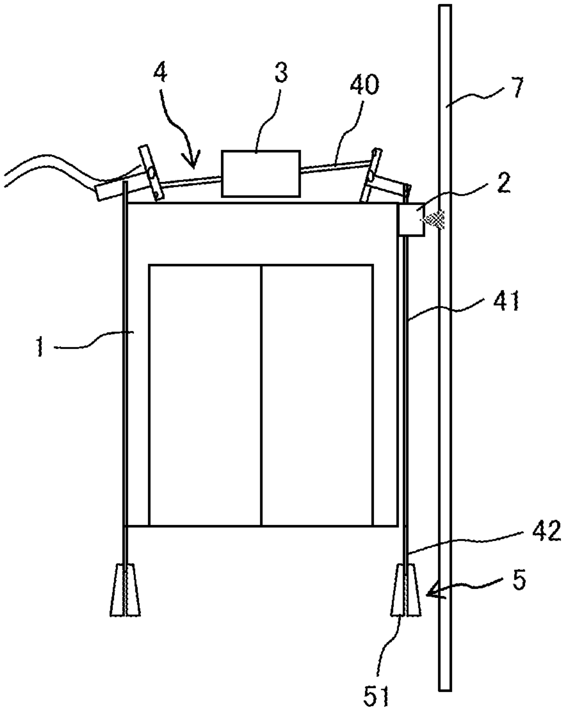
FIG. 1 is a schematic structural diagram of an elevator device which is Example 1.

FIG. 1 is a schematic structural diagram of an elevator device which is Example 1 of the present invention.

Figure 2:
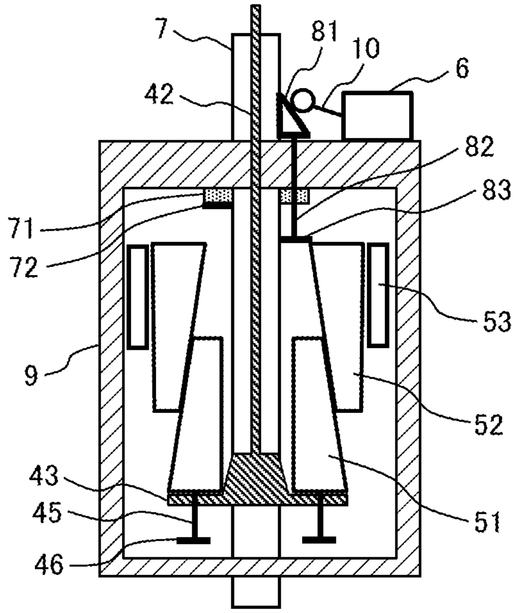
FIG. 2 is a structural diagram depicting a detailed structure of a safety gear in Example 1.

As is depicted in FIG. 1, the elevator device has an elevator car 1, a position sensor 2, an electrically operated actuator 3, a link mechanism 4, and a safety gear 5. Note that the safety gear 5 is depicted in a simplified manner in FIG. 1 and a detailed structure of the safety gear 5 is described later (FIG. 2).

The elevator car 1 is suspended by a main rope (which is not depicted) inside a hoistway provided in a building and slidably engaged with a guide rail 7 via a guide device. When the main rope is friction driven by a driving machine (traction machine), the elevator car 1 ascends and descends inside the hoistway.

The position sensor 2 is provided on the elevator car 1, and it detects the position of the elevator car 1 inside the hoistway and always detects the ascending and descending speed of the elevator car 1 from the detected position of the elevator car 1. Therefore, by the position sensor 2, it can be detected that the ascending and descending speed of the elevator car has exceeded a predetermined overspeed.

In the present Example 1, the position sensor 2 has an image sensor, and the position and speed of the elevator car are detected based on image information of surface states of the guide rail 7 captured by the image sensor. For example, the position of the elevator car 1 is detected by checking image information captured by the image sensor against image information of surface states of the guide rail 7 measured in advance and stored in a storage device.

Note that a rotary encoder that is provided on the elevator car and rotates with movement of the elevator car may be used as the position sensor 2.

The electrically operated actuator 3 is an electromagnetic actuator in the present Example 1 and provided on the top of the elevator car 1. The electromagnetic actuator is driven by, e.g., a solenoid or an electromagnet and provided with a movable piece or a movable lever. The electrically operated actuator 3 becomes activated when the position sensor 2 has detected the predetermined overspeed state of the elevator car 1 and displaces the link mechanism 4 to make the safety gear 5 enter a braking state.

The link mechanism 4 includes a link shaft 40 which is driven by the electrically operated actuator 3, a pull-up link 41 which links movably with the link shaft 4, and a pull-up rod 42 which is coupled to the pull-up link 41. In response to activation of the electrically operated actuator 3, the link mechanism pulls up the pull-up rods 42 disposed on the left and right of the elevator car 1 at substantially the same time via the pull-up links 41. Along with this, braking elements 51 of the safety gear 5 installed to the pull-up rods 42 are pulled up to a braking position and then the braking elements 51 hold the guide rails 7.

The safety gear 5 is disposed on the left and right of the elevator car 1. The braking elements 51 provided in the safety gear 5 can move between a braking position and a non-braking position, as will be described later, and hold the guide rails 7 in the braking position. Moreover, when the braking elements are ascending relatively with descending of the elevator car 1, braking force is produced by friction force exerted between the braking elements 51 and the guide rails 7. In this way, the safety gear 5 becomes activated when the elevator car 1 has fallen into the overspeed state, and emergently stops the elevator car 1.

Additionally, a braking state detecting switch (which is not depicted in FIG. 1) (see a reference numeral "6" in FIG. 2) is fixedly provided onto the safety gear 5. The braking state detecting switch is actuated by a braking element 51 and detects that the respective safety gear 5 disposed on the left and right of the elevator car 1 is placed in the braking state. As the braking state detecting switch, a mechanical switch in which an electrical contact is opened and closed by mechanical action of a button, a lever, etc., for example, a micro switch or the like is applied.

The elevator device of the present Example 1 includes a so-called rope-less governor system without using a governor rope. When the ascending and descending speed of the elevator car 1 exceeds a rated speed and reaches a first overspeed (e.g., a speed not more than 1.3 times the rated speed), the governor system shuts off the power supply of the driving machine (traction machine) which drives traction sheaves and the power supply of a controller which controls the driving machine. Moreover, when the descending speed of the elevator car 1 reaches a second overspeed (e.g., a speed not more than 1.4 times the rated speed), the governor system electrically drives the electrically operated actuator 3 provided on the elevator car 1 and activates the safety gear 5 to emergently stop the elevator car 1.

In the present Example 1, the rope-less governor system is comprised of the position sensor 2 having the image sensor and a safety controller which determines whether the elevator car 1 is placed in the overspeed state based on output signals of the position sensor 2. This safety controller measures the speed of the elevator car 1 based on the output signals of the position sensor 2 and, upon determining that the measured speed has reached the first overspeed, outputs a command signal to shut off the power supply of the driving machine (traction machine) and the power supply of the controller which controls the driving machine. Moreover, upon determining that the measured speed has reached the second overspeed, the safety controller outputs a command signal to drive the electrically operated actuator 3.

Note that, as the position sensor, the rope-less governor system may use a sensor (e.g., a rotary encoder among others) which is provided on the elevator car and outputs signals depending on movement of the elevator car may be used, not limited to the image sensor.

FIG. 2 is a structural diagram depicting a detailed structure of the safety gear 5 (FIG. 1) in the present Example 1.

The link mechanism 4 (FIG. 1) includes a pull-up link 41 and a pull-up rod 42, as mentioned previously, and the pull-up link 41 is displaced in response to activation of the electrically operated actuator 3. The pull-up link 41 is coupled to the top end of the pull-up rod 42. Also, to the bottom end of the pull-up rod 42, a pedestal 43 is coupled on which the braking elements 51 of the safety gear 5 are mounted. Therefore, when the pull-up link 41 is displaced upward, the pull-up rod 42 and the pedestal 43 are also displaced upward and, along with this, the braking elements 51 are displaced upward.

The safety gear 5 includes the braking elements 51, inclined pieces 52, and elastic pieces 53.

A braking element 51 has a wedge-like shape and its width becomes narrower from bottom to top. A side of the braking element 51 facing the guide rail 7 is a substantially vertical surface and its opposite side oriented away from the guide rail is a smooth surface. The braking elements 51 can move between the braking position and the non-braking position in a vertical direction. In FIG. 2, the braking elements 51 are placed in the non-braking position and their vertical surfaces are apart from the guide rail 7. When the braking elements 51 are placed in the braking position, they hold the guide rail 7 with their vertical surfaces contacting with the guide rail 7.

The braking elements are mounted on the pedestal 43 with braking element fitting pins 45. One end of each braking element fitting pin 45 is fixed to each braking element 51 and the pin slidably passes through the pedestal 43. The length of each braking element fitting pin 45 is set long enough so that the braking element fitting pin 45 does not come off from the pedestal 43 when the safety gear 5 is activated in an emergency. Additionally, a stopper portion 46 is attached to the other end of the braking element fitting pin 45 to prevent the braking element fitting pin 45 from coming off from the pedestal 43.

An inclined piece 52 is positioned on the side of the braking element 51 oriented away from the guide rail. The inclined piece 52 has a wedge-like shape and its width becomes narrower from top to bottom. A side of the inclined piece 52 abutting the side of the braking element is an inclined smooth surface and its opposite side oriented away from the braking element is a substantially vertical surface.

An elastic piece 53 is placed on an outer side of the inclined piece 52 and exerts elastic force on the inclined piece 52. The elastic pieces 53, each of which is formed of e.g., a U-shaped spring, press a pair of the braking elements 51 and a pair of the inclined pieces 52 from both outsides.

Incidentally, in the present Example 1, the braking elements 51, the inclined pieces 52, and the elastic pieces 53 are placed within a frame-like or housing-like body part 9.

When the braking state detecting switch 6 is turned on by a switch turn-on mechanism as will be described later, it detects that the safety gear 5 is placed in an emergency braking state (see FIG. 4). Additionally, in the present Example 1, the braking state detecting switch 6 is provided on the outside surface of the horizontal top of the body part 9, as is depicted in FIG. 2.

On the back side of the outside surface, where the braking state detecting switch 6 is provided, of the horizontal top of the body part 9, in other words, on the inside surface of the horizontal top of the body part 9, abutment plate pieces 71 are provided in positions just above the top faces of the braking elements 51. Moreover, a spacer 72 which is as thick as a stopper portion 83 which will be described later is attached to the surface of an abutment plate piece 71 facing the top face of a braking element 51. In an emergency braking, the top faces of the braking elements 51 abut on the abutment plate pieces 71 with the space 72 and the stopper portion 83 being interposed. The amount of displacement of the braking elements 51 in the emergency braking is adjusted by the thickness of the abutment plate pieces 71. Note that the braking elements may abut on the body part 9 with the spacer 72 and the stopper portion 83 interposed without provision of the abutment plate pieces 71.

The switch turn-on mechanism in the present Example 1 is comprised of a cam fitting pin 82 which slidably passes through the horizontal top of the body part 9, a cam 81 which is provided on the outside surface of the horizontal top of the body part 9, attached to one end of the cam fitting pin 82, and a stopper portion 83 which is attached to the other end of the cam fitting pin 82 positioned inside the body part 9 to prevent the cam fitting pin 82 from coming off from the body part 9. Note that the cam fitting pin 82, the cam 81, and the stopper portion 83 are positioned just above the top face of one of the pair of the braking elements 51. In addition, a longitudinal direction of the braking element 51, a longitudinal direction of the cam fitting pin 82, and the cam are arranged substantially linearly.

When the electrically operated actuator 3 is activated, the braking elements 51 are displaced upward to a first displacement position (see FIG. 3), but one of the braking elements 51 does not press the stopper portion 83 upward before and when having arrived at the first displacement position. Accordingly, a lever part 10 of the braking state detecting switch 6 is not moved by the cam 81 and the braking state detecting switch 6 remains in an off state.

At the time of emergency stop, with further descending of the elevator car 1, one of the braking elements 51 pushes up the stopper portion 83. Then, when the braking elements 51 are displaced from the first displacement position to a second displacement position (see FIG. 4), the cam 81 is displaced upward. Accordingly, the lever part 10 of the braking state detecting switch 6 is moved by the cam 81 to turn the braking state detecting switch 6 into an on state.

The switch turn-on mechanism as described above makes the braking state detecting switch 6 remain in the off state when the electrically operated actuator 3 is activated due to loss of power supply to the elevator device and turns on the braking state detecting switch 6 when the safety gear 5 comes into an emergency braking state.

Figure 3:
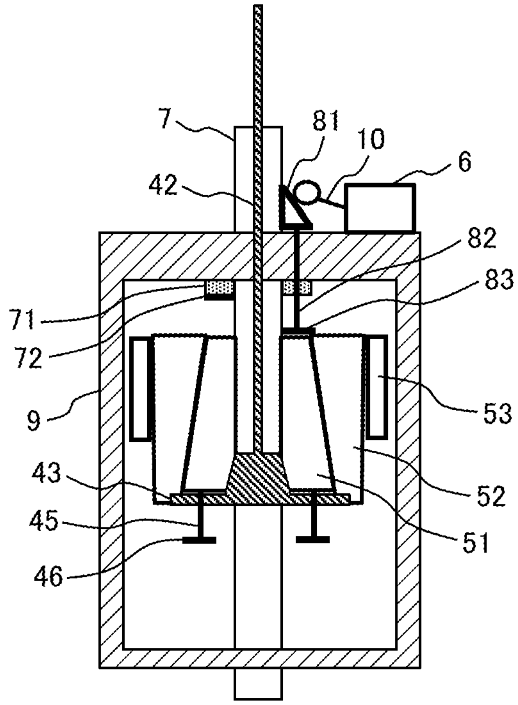
FIG. 3 is a diagram depicting an operation state of the braking state detecting switch in Example 1 when power supply is lost.
Figure 4:
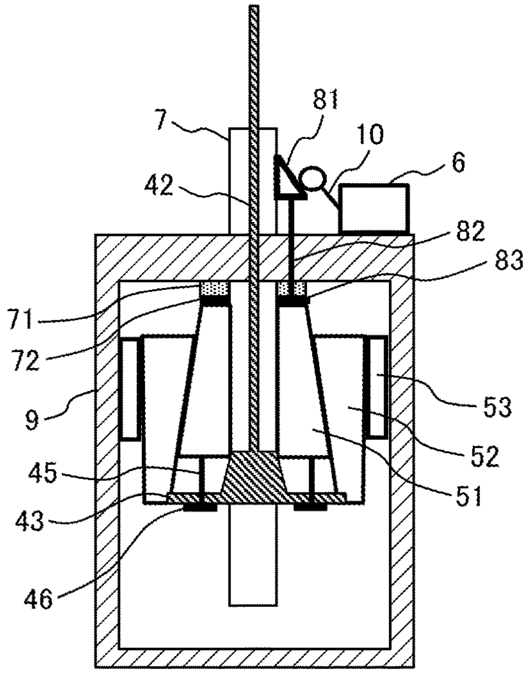
FIG. 4 is a diagram depicting an operation state of the braking state detecting switch in Example 1 in an emergency braking.

Here, operation of turning on the braking state detecting switch 6 is described with FIGS. 2 to 4.

FIG. 3 is a diagram depicting an operation state of the braking state detecting switch 6 in the present Example 1 when power supply is lost. In addition, FIG. 4 is a diagram depicting an operation state of the braking state detecting switch 6 in the present Example 1 in the emergency braking. Incidentally, FIG. 2 referred to previously depicts an operation state of the braking state detecting switch 6 when the elevator device operates normally.

When in normal operation, the electrically operated actuator 3 is inoperative and the braking elements 51 of the safety gear 5 are placed in a non-braking state in which they are apart from the guide rail 7, as in FIG. 2.

When a utility power interruption occurs and power supply to the elevator device is lost, the electrically operated actuator 3 comes into an operative state.

Activation of the electrically operated actuator 3 displaces the pull-up link 41, pulling the pull-up rod 42 and the pedestal 43 upward, as in FIG. 3, and the pedestal 43 and the braking elements 51 mounted on the pedestal 43 are displaced up to the first displacement position. At this time, the braking elements 51 are displaced upward, sandwiched between the inclined pieces and, accordingly, the sides of the braking elements 51 facing the guide rail 7 come close to the guide rail 7 and the guide rail 7 is held by the braking elements 51 in the first displacement position.

In addition, the stopper portion 83 attached to the one end of the cam fitting pin 82 is positioned just above the top face of the pair of the braking elements 51. However, the braking element 51 comes close to the stopper portion 83, but does not press the stopper portion 83 upward as far as moving from its position where it is in the inoperative state to the first displacement position (see FIG. 3). Accordingly, the lever part 10 of the braking state detecting switch 6 is not moved by the cam 81 and the braking state detecting switch 6 remains in the off state.

Additionally, as the pull-up rod 42 is pulled up, the braking elements 51 of the safety gear 5 are also pulled up and come into contact with the guide rail 7, whereas the elevator car 1 does not move because of power interruption. Upon recovery from a power supply loss state to a power supply state, i.e., recovery from power interruption, the electrically operated actuator 3 returns to the inoperative state, i.e., its normal state again. When the pull-up rod 42 and the pedestal 43 descend, the braking elements 51 also descend and the braking elements 51 return to the non-braking state in which they are apart from the guide rail 7, as in FIG. 2.

As so far noted, when power is lost due to power interruption, the pull-up rod 42 and the pedestal 43 are pulled up and the braking elements 51 are displaced upward, but the cam 81 does not turn on the braking state detecting switch 6. Thus, the elevator device can be restarted without need of switching off from the on state of the braking state detecting switch by a technical expert.

Furthermore, when the descending speed of the elevator car 1 reaches the second overspeed and the electrically operated actuator 3 is activated, the pull-up link 41 is displaced and the pull-up rod 42 and the pedestal 43 are pulled up. Along with this, the braking elements 51 of the safety gear 5 are also pulled up to the first displacement position and the braking elements 51 come into contact with the guide rail 7, as in FIG. 3.

When the elevator car 1 further descends from this state, the braking elements 51 ascend relatively to the elevator car 1 and are displaced up to the second displacement position, as in FIG. 4. Meanwhile, guided by the inclined pieces 52, the braking elements move horizontally to have a tight grasp on the guide rail 7 from both sides. Additionally, at this time, one (the left one in FIG. 4) and the other (the right one in FIG. 4) of the pair of the braking elements 51 abut on the abutment plate pieces 71 with the space 72 and the stopper portion 83 being interposed, respectively.

In the state depicted in FIG. 4, elastic force of the elastic pieces 53 are exerted on the braking elements 51 through the inclined pieces 52 and friction force proportional to the elastic force (a proportional coefficient is a “sliding friction coefficient”) is produced between the braking elements 51 and the guide rail 7. This force causes the elevator car 1 to decelerate and stop.

After the braking elements 51 are displaced up to the first displacement position, as the elevator car 1 further descends with the braking elements 51 holding the guide rail, the braking elements 51 are displaced upward relatively to the elevator car 1 and the body part 9 which is fixed to the elevator car 1. Meanwhile, one of the braking elements 51 pushes up the stopper portion 83 at the bottom end of the cam fitting pin 82. Then, when the braking elements 51 are displaced from the first displacement position up to the second displacement position, the cam 81 which is fixed to the top end of the cam fitting pin 82 provided with the stopper portion 83 is displaced upward relatively to the body part 9. Accordingly, the lever part 10 of the braking state detecting switch 6 is moved by the cam 81 to turn the braking state detecting switch 6 into the on state.

In a case where the elevator car 1 is forced to stop by emergency braking in this way, recovery of the elevator device is performed including switching off the braking state detecting switch by a technical expert.

As described hereinbefore, according to the present Example 1, the braking state detecting switch 6 which is provided onto the body part 9 of the safety gear 5 is actuated by the switch turn-on mechanism which is mobilized by a braking element 51 of the safety gear 5 interlinked with the electrically operated actuator 3. Displacement of the braking element 51 when power supply is lost keeps the braking state detecting switch in the off state. Displacement of the braking element 51 in the emergency braking turns on the braking state detecting switch 6. Thus, on one hand, emergency braking operation of the safety gear 5 is ensured; on the other hand, in case of power interruption, the braking state detecting switch 6 is not turned on even though the electrically operated actuator 3 is put in operation. Therefore, once recovery has been made from power interruption, the elevator can be restarted immediately.

In addition, according to the present Example 1, the braking state detecting switch 6 is actuated by the switch turn-on mechanism which is mobilized by a braking element 51; therefore, operation states of the braking elements 51 can be detected accurately.

In addition, according to the present Example 1, the switch turn-on mechanism has the cam 81 and the cam fitting pin 82 to which the cam is fixed. Upward displacement of the braking elements 51 drives and pushes up the cam fitting pin 82 and, in turn, displaces the cam 81 upward to turn on the braking state detecting switch 6. Thereby, operation states of the braking elements 51 can be detected accurately.

Furthermore, according to the switch turn-on mechanism in the present Example 1, it is possible to reduce a space occupied by the switch turn-on mechanism in the safety gear. Therefore, it is possible to mount the braking state detecting switch 6 on the safety gear 5 without enlarging the safety gear 5.

Example 2

Figure 5:
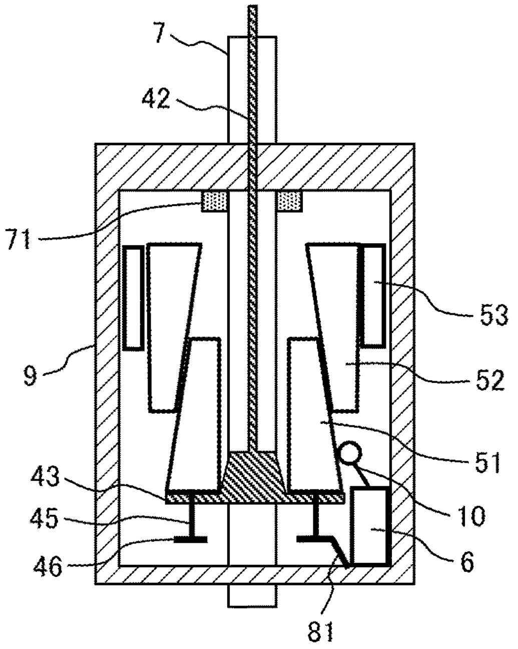
FIG. 5 is a structural diagram depicting a detailed structure of a safety gear provided in an elevator device which is Example 2.

FIG. 5 is a structural diagram depicting a detailed structure of a safety gear provided in an elevator device which is Example 2 of the present invention. Incidentally, a general structure of the elevator device is the same as in Example 1 (FIG. 1).

Points of difference from Example 1 are mainly described below.

As is depicted in FIG. 5, in Example 2, the braking state detecting switch 6 is provided inside the body part 6, which differs from Example 1 (FIG. 2). More specifically, the braking state detecting switch 6 is provided on a surface, which is exposed inside the body part 9, of the horizontal bottom of the body part 9.

A cam 81 which actuates the braking state detecting switch 6 is attached to the other end of a braking element fitting pin 45, one end of which is fixed to one (the right one in FIG. 5) of the pair of the braking elements 51. Incidentally, the cam 81 prevents the braking element fitting pin 45 from coming off from the pedestal 43, like a stopper portion 46. Additionally, the braking element fitting pin 45 and the cam 81 which constitute the switch turn-on mechanism are positioned beneath the bottom of the one of the pair of the braking elements 51. Also, a longitudinal direction of the braking element 51, a longitudinal direction of the braking element fitting pin 45, and the cam 81 are arranged substantially linearly.

In addition, in the present Example 2, in the emergency braking, the top faces of the braking elements 51 directly abut on the abutment plate pieces 71 without a member such as the spacer 72 (FIG. 2) being interposed (see FIG. 4).

Figure 6:
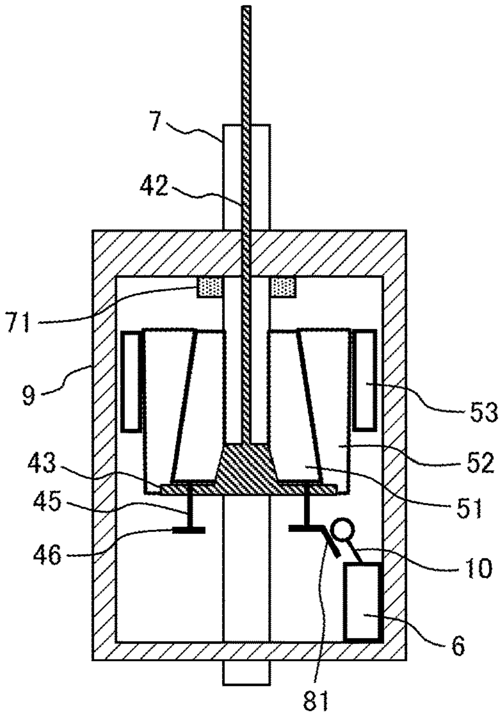
FIG. 6 is a diagram depicting an operation state of the braking state detecting switch in Example 2 when power supply is lost.
Figure 7:
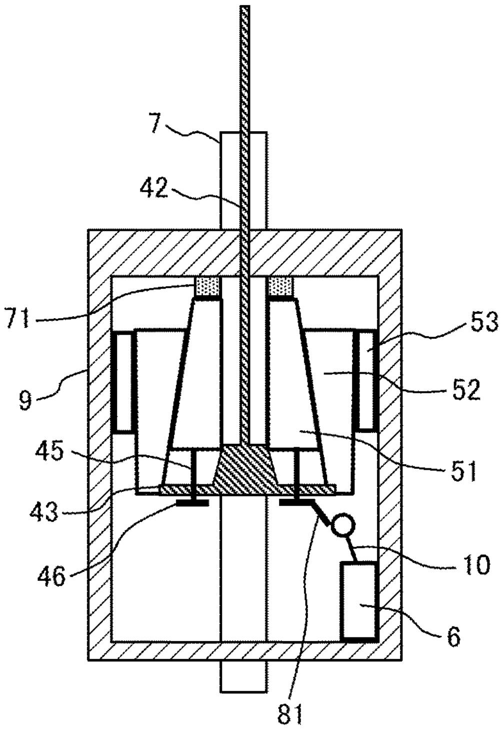
FIG. 7 is a diagram depicting an operation state of the braking state detecting switch in Example 2 in an emergency braking.

Here, operation of turning on the braking state detecting switch 6 is described with FIGS. 5 to 7.

FIG. 6 is a diagram depicting an operation state of the braking state detecting switch 6 in the present Example 2 when power supply is lost. In addition, FIG. 7 is a diagram depicting an operation state of the braking state detecting switch 6 in the present Example 2 in the emergency braking. Additionally, FIG. 5 referred to previously depicts an operation state of the braking state detecting switch 6 when the elevator device operates normally.

As is the case for Example 1, when in normal operation, the electrically operated actuator 3 is inoperative and the braking elements 51 of the safety gear 5 are placed in a non-braking state in which they are apart from the guide rail 7, as in FIG. 5. In addition, when a utility power interruption occurs and power supply to the elevator device is lost, the electrically operated actuator 3 comes into an operative state.

Activation of the electrically operated actuator 3 displaces the pull-up link 41, pulling the pull-up rod 42 and the pedestal 43 upward, as in FIG. 6, and the pedestal 43 and the braking elements 51 mounted on the pedestal 43 are displaced up to the first displacement position. At this time, the braking elements 51 are displaced upward, sandwiched between the inclined pieces and, accordingly, the sides of the braking elements 51 facing the guide rail 7 come close to the guide rail 7 and the guide rail 7 is held by the braking elements 51 in the first displacement position.

In addition, the braking elements 51 remaining in contact with the pedestal 43 are displaced upward together with the pedestal 43 as far as moving from its position where it is in the inoperative state to the first displacement position. Here, the length of the braking element fitting pins 45 is set long enough so that the cam 81 comes close to the lever part 10 of the braking state detecting switch 6, but does not move the lever part 10. Accordingly, in the first displacement position, the lever part 10 of the braking state detecting switch 6 is not moved by the cam 81 and the braking state detecting switch 6 remains in the off state, as in FIG. 6.

Furthermore, when the descending speed of the elevator car 1 reaches the second overspeed and the electrically operated actuator 3 is activated, the pull-up link 41 is displaced and the pull-up rod 42 and the pedestal 43 are pulled up. Along with this, the braking elements 51 of the safety gear 5 are also pulled up to the first displacement position and the braking elements 51 come into contact with the guide rail 7, as in FIG. 6.

When the elevator car 1 further descends from this state, the braking elements 51 ascend relatively to the elevator car 1 and are displaced up to the second displacement position, as in FIG. 7, as is the case for Example 1 (FIG. 4). Meanwhile, guided by the inclined pieces 52, the braking elements move horizontally to have a tight grasp on the guide rail 7 from both sides. Additionally, at this time, one (the left one in FIG. 7) and the other (the right one in FIG. 7) of the pair of the braking elements 51 both directly abut on the abutment plate pieces 71 in the present Example 2.

After the braking elements 51 are displaced up to the first displacement position, as the elevator car 1 further descends with the braking elements 51 holding the guide rail 7, the braking elements 51 are displaced upward relatively to the elevator car 1 and the body part 9 which is fixed to the elevator car 1. Meanwhile, the cam 81 fixed to the bottom end of the braking element fitting pin 45 is displaced upward relatively to the body part 9. Accordingly, the lever part 10 of the braking state detecting switch 6 is moved by the cam 81 to turn the braking state detecting switch 6 into the on state.

As described hereinbefore, according to the present Example 2, the braking state detecting switch 6 which is provided in the body part 9 of the safety gear 5 is actuated by the switch turn-on mechanism which is mobilized by a braking element 51 of the safety gear 5 interlinked with the electrically operated actuator 3. Displacement of the braking element 51 when power supply is lost keeps the braking state detecting switch in the off state. Displacement of the braking element 51 in the emergency braking turns on the braking state detecting switch 6. Thus, on one hand, emergency braking operation of the safety gear 5 is ensured; on the other hand, in case of power interruption, the braking state detecting switch 6 is not turned on even though the electrically operated actuator 3 is put in operation. Therefore, once recovery has been made from power interruption, the elevator can be restarted immediately without need of switching off from the on state of the braking state detecting switch by a technical expert.

In addition, according to the present Example 2, the braking state detecting switch 6 is actuated by the switch turn-on mechanism which is mobilized by a braking element 51; therefore, operation states of the braking elements 51 can be detected accurately.

In addition, according to the present Example 2, the switch turn-on mechanism has the braking element fitting pin 45 and the cam 81 which is fixed to the braking element fitting pin 45. By upward displacement of the braking element fitting pin 45 driven by the braking elements 51, in other words, by upward displacement of the braking element fitting pin 45 and the cam 81 along with the braking element 51, the braking state detecting switch 6 is turned on. Thereby, operation states of the braking elements 51 can be detected accurately.

Furthermore, according to the switch turn-on mechanism in the present Example 2, it is possible to reduce a space occupied by the switch turn-on mechanism in the safety gear. Therefore, it is possible to mount the braking state detecting switch 6 in the safety gear 5 without enlarging the safety gear 5.

Note that the present invention is not limited to the examples described hereinbefore and various modifications are included therein. For example, the foregoing examples are those described in detail to explain the present invention to make it easy to understand and the invention is not necessarily limited to those including all components described. In addition, for a subset of the components of an example, other components may be added to the subset or the subset may be removed or replaced by other components.

For example, the electrically operated actuator 3 may be provided on the underside or a lateral side as well as on the top of the elevator car 1. In addition, the electrically operated actuator may be one that is provided with a linear actuator.

REFERENCE SIGNS LIST

1 . . . elevator car, 2 . . . position sensor, 3 . . . electrically operated actuator, 4 . . . link mechanism 4, 5 . . . safety gear, 6 . . . braking state detecting switch, 7 . . . guide rail, 9 . . . body part, 10 . . . lever part, 41 . . . pull-up link, 42 . . . pull-up rod, 43 . . . pedestal, 45 . . . braking element fitting pin, 46 . . . stopper portion, 51 . . . braking element, 52 . . . inclined piece, 53 . . . elastic piece, 71 . . . abutment plate piece, 72 . . . spacer, 81 . . . cam, 82 . . . cam fitting pin, 83 . . . stopper portion

The invention claimed is:

1. An elevator device comprising:

a safety gear which is provided onto an elevator car;

an electrically operated actuator which activates the safety gear; and a braking state detecting switch to detect a braking state of the safety gear;

wherein the braking state detecting switch is actuated by a mechanism which is mobilized by a braking element of the safety gear;

wherein displacement of the braking element when power supply is lost keeps the braking state detecting switch in an off state;

wherein displacement of the braking element in a braking by the safety gear turns on the braking state detecting switch;

wherein the braking state detecting switch is provided onto a body part of the safety gear;

wherein the mechanism includes a cam to actuate the braking state detecting switch and a pin to which the cam is attached; and wherein the pin is driven by the braking element.

2. The elevator device according to claim 1, wherein the mechanism is positioned directly above or beneath the braking element.

3. The elevator device according to claim 2, wherein the braking element, the pin, and the cam are arranged linearly.

4. The elevator device according to claim 1, wherein the braking state detecting switch is provided on an outside surface of a top of the body part;

the pin passes through the top of the body part;

the cam is attached to one end of both ends of the pin, the one end being positioned in the outside surface of the top of the body part; and the braking element pushes up the other end of the pin in the braking by the safety gear.

5. The elevator device according to claim 1, wherein the braking state detecting switch is provided inside the body part;

one end of the pin is fixed to the braking element; and the cam is attached to the other end of the pin.

6. The elevator device according to claim 1, wherein, when recovery is made from a power supply loss state to a power supply state, the electrically operated actuator returns to its normal state.

7. The elevator device according to claim 1, wherein the braking state detecting switch is a mechanical switch.

8. The elevator device according to claim 1, wherein the electrically operated actuator is an electromagnetic actuator.

* * * * *